United States Patent

Valentine, Sr.

[11] Patent Number: 5,815,940
[45] Date of Patent: Oct. 6, 1998

[54] TAKE-OUT METER FOR USE IN ASSOCIATION WITH A CONVENTIONAL RETRACTABLE MEASURING TAPE

[76] Inventor: Cooper Valentine, Sr., 401 Gibbsboro Rd., Lindenwold, N.J. 08021

[21] Appl. No.: 847,562

[22] Filed: Apr. 24, 1997

[51] Int. Cl.⁶ .................................................. G01B 3/10
[52] U.S. Cl. .............................. 33/770; 33/759; 33/768
[58] Field of Search .............................. 33/758, 757, 770, 33/768, 668, 760, 484, 486, 529

[56] References Cited

U.S. PATENT DOCUMENTS

| | | | |
|---|---|---|---|
| 848,387 | 3/1907 | Nielson | 33/486 |
| 925,384 | 6/1909 | Richardson | 33/770 |
| 1,713,891 | 5/1929 | Dooley | 33/770 |
| 1,973,843 | 9/1934 | Buck | 33/770 |
| 2,396,877 | 3/1946 | Peterson | 33/770 |
| 3,744,134 | 7/1973 | Zima, Jr. | 33/768 |
| 4,603,481 | 8/1986 | Cohen et al. | 33/768 |
| 4,827,622 | 5/1989 | Makar | 33/770 |
| 4,999,924 | 3/1991 | Shields | 33/668 |
| 5,481,813 | 1/1996 | Templeton | 33/770 |

FOREIGN PATENT DOCUMENTS 243335  2/1987  Germany ................................. 33/770

*Primary Examiner*—Thomas B. Will

[57] ABSTRACT

A take-out meter for attachment to a conventional metal retractable tape measure permitting use of the tape measure with architectural/engineering drawing measurements without the need for repetitive subtractions of fittings measurements.

2 Claims, 4 Drawing Sheets

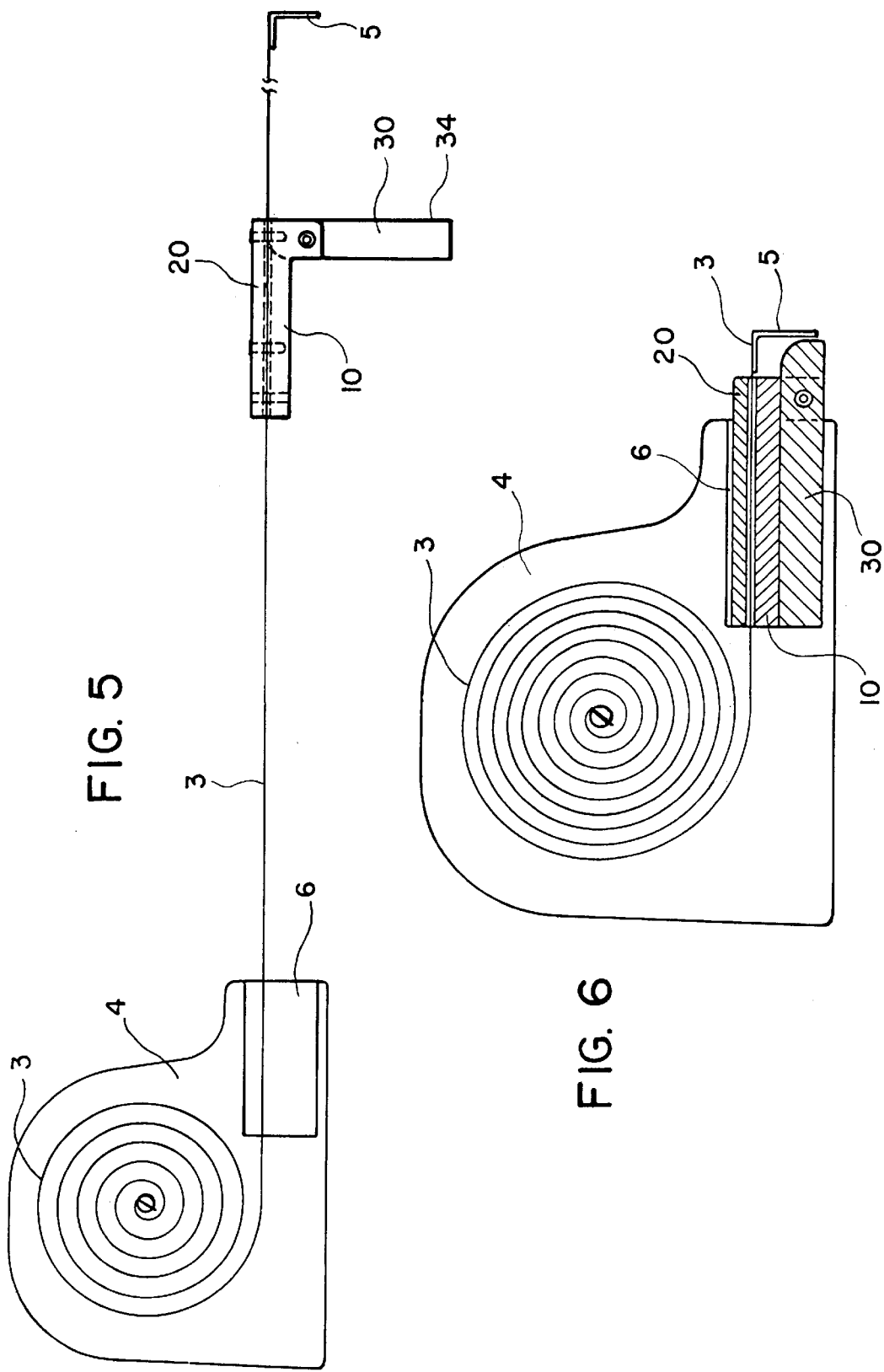

TAKE-OUT METER FOR USE IN ASSOCIATION WITH A CONVENTIONAL RETRACTABLE MEASURING TAPE

This invention relates to a take-out meter for use in association with a conventional retractable measuring tape and to the combination of the takeout meter with such conventional measuring tape.

The conventional tape measure commonly used by pipefitters, carpenters, and the like comprises a metal, coilable tape attached at one end to a spool or drum in a housing with a limiting hook or stop at the other end. A cross-section of the metal tape generally is arcuate to provide a certain degree of rigidity to the extended tape without, however, destroying the normal resiliently-coilable nature of the metal tape. Such tape measures are well known in the art and are described in detail in a number of patents including U.S. Pat. No. 3,744,134 to Zima, Jr. and in the patents referred to and/or cited therein. Such measuring tapes will be referred to hereinafter simply as "conventional retractable measuring tapes." The present invention will be described hereinafter with regard to such conventional retractable measuring tapes.

When architects or engineers provide construction drawings to subcontractors for the installation of piping fixtures, it is common practice, particularly with the larger sizes of piping fixtures, to specify the lengths of pipe in terms of measurements made from the center line of a fixture attached to one end of the pipe to the center line of a fixture attached to the other end of a pipe. The term "fixture" herein is used to designate elbows, tees, and the like. FIG. 1 illustrates this type of measurement as provided to a pipefitter. As illustrated in FIG. 1, a six inch diameter cast iron pipe is provided with right angle elbows at each end connected to the pipe by butt welds. Typically the architect or engineer might simply designate between centers of the right angle portion of the elbows as twelve (12) feet. The experienced pipefitter preparing to cut the necessary length of six inch diameter, stock pipe, knows that the distance for a six inch diameter pipe elbow from the center line to the weld is nine inches. However, since there is an elbow at each end, he doubles the nine (9) inches, and subtracts eighteen (18) inches from the twelve foot center-to-center measure provided by the architect/engineer, and concludes that he must cut a piece ten (10) feet six (6) inches in length. The pipefitter then must measure that length of pipe on a stock length of pipe and mark the ten (10) feet, six (6) inch location for cutting. All too frequently, the pipefitter finds it necessary to have an assistant hold one end of the tape measure against one end of the stock length of pipe while the pipefitter pulls out the tape measure until he reaches a point where he can identify and mark the ten (10) feet, six (6) inches on the pipe and then proceed to the next pipe. If only a few pipes were involved, this would not be a matter of serious concern. However, in new construction of factories, office buildings, and the like, the times expended in the above-mentioned steps, the opportunities for errors, and the need for an assistant all add unnecessarily to the pipefitting costs.

It is, therefore, an object of the present invention to provide an attachment to a conventional retractable measuring tape which will permit a pipefitter to make such measurements quickly and easily, with little likelihood of error, and without the need for an assistant. It is a further object of the present invention to provide such an attachment that can be either retrofit on existing conventional retractable measuring tape or which can be built into and be part of conventional retractable measuring tapes at the time of their assembly.

These and other objects will be apparent from the following disclosure and appended claims.

SUMMARY OF THE INVENTION

The invention consists essentially of a "take-out meter" comprising three basic parts, a tape receiver body or meter body, a tape-retaining view plate, and a meter clip, or pivotable clamp/stop. The tape receiving body is provided with a central longitudinal channel adapted to receive the metal measuring tape including the entire arc of the tape. A tape-retaining view plate is then placed over the channel including the tape in a manner to retain the tape in the channel without impeding movement of the tape through the channel. An opening in the tape-retaining view plate permits the reading of the tape through the view plate. The combination of the tape-receiving body and the tape-retaining view plate, with tape in place, is provided with a pivotable clamp/stop which, when pivoted into a position essentially at right angles to the tape-receiving body exerts pressure on the tape to clamp it in place against the tape-retaining view plate. The pivotable clamp/stop is mounted in such a way that pressure against the trailing edge of the clamp relative to the free tape end maximizes clamping pressure so that when pressure is placed on the leading edge of the pivotable clamp/stop, the clamp pivots and releases, permitting the tape once again to pass through the channel in the tape-receiving body.

In using the attachment of the present invention, it is placed on a conventional retractable tape measure indicated above. The pipefitter making measurements in accordance with architectural and/or engineering drawings notes from the drawing that six inch pipe is being used and knows that the center to butt weld of each elbow as shown in FIG. 1 is nine (9) inches. Accordingly, the pipefitter slides the attachment of the present invention along the tape until eighteen (18) inches is aligned with the leading edge of the window in the tape-retaining view plate. The pivotable clamp/stop is then pivoted into its clamping position at right angles to the tape-receiving body and the tape so that the tape attachment is now prevented from sliding along the tape. The device is designed such that the trailing edge of the pivotable clamp/stop is aligned with the leading edge of the window in the tape-retaining view plate. The pipefitter then places the tape on a stock length of pipe to be cut, with the trailing edge of the pivotable clamp/stop resting against a free end of the pipe, and extends the tape measure to a reading corresponding to the distance between centers shown on the architectural or engineering drawings and cuts the pipe. Thus, in FIG. 1 where the drawing shows twelve (12) feet, the pipefitter will extend the tape measure along the stock pipe to the twelve (12) foot reading, mark the pipe, and cut it at that mark. In reality, however, the actual length of pipe cut from the stock length of pipe will be ten (10) feet, six (6) inches. The pipefitter can now move on to other measurements from drawings for pipes of similar fitting sizes, e.g., a sixteen (16) foot length of pipe, a fourteen (14) foot three (3) inch length of pipe, et cetera, with no need for readjusting the attachment on the tape measure and with no need for stopping to do the subtraction or other arithmetic in order to determine the actual length of pipe to be cut. That subtraction is done automatically by the setting of the attachment on the tape measure so that the pipefitter need only measure to the mark corresponding to the architect's or engineer's directions on the drawings. Further, the take-out meter of the present invention can be made with appropriately placed, imbedded magnets so that when the pipe to be measured and cut is iron or other ferromagnetic material, the magnets in the attachment will grip the pipe in a manner permitting the pipefitter to conduct the measurement without the need for a "third hand" or an additional person to hold the tape in place while the measurement is made.

BRIEF DESCRIPTION OF THE DRAWINGS

FIG. 5 illustrates a conventional retractable tape measure and the attachment of the present invention with the tape in extended position, ready for measurement of a piece of stock pipe.

FIG. 6 is a front elevation of a retractable tape measure having the attachment of the present invention with the pivotable clamp/stop in the unclamped position, and with the tape and the attachment retracted into a modified tape measure housing.

DESCRIPTION OF THE PREFERRED EMBODIMENTS

Figure 2:
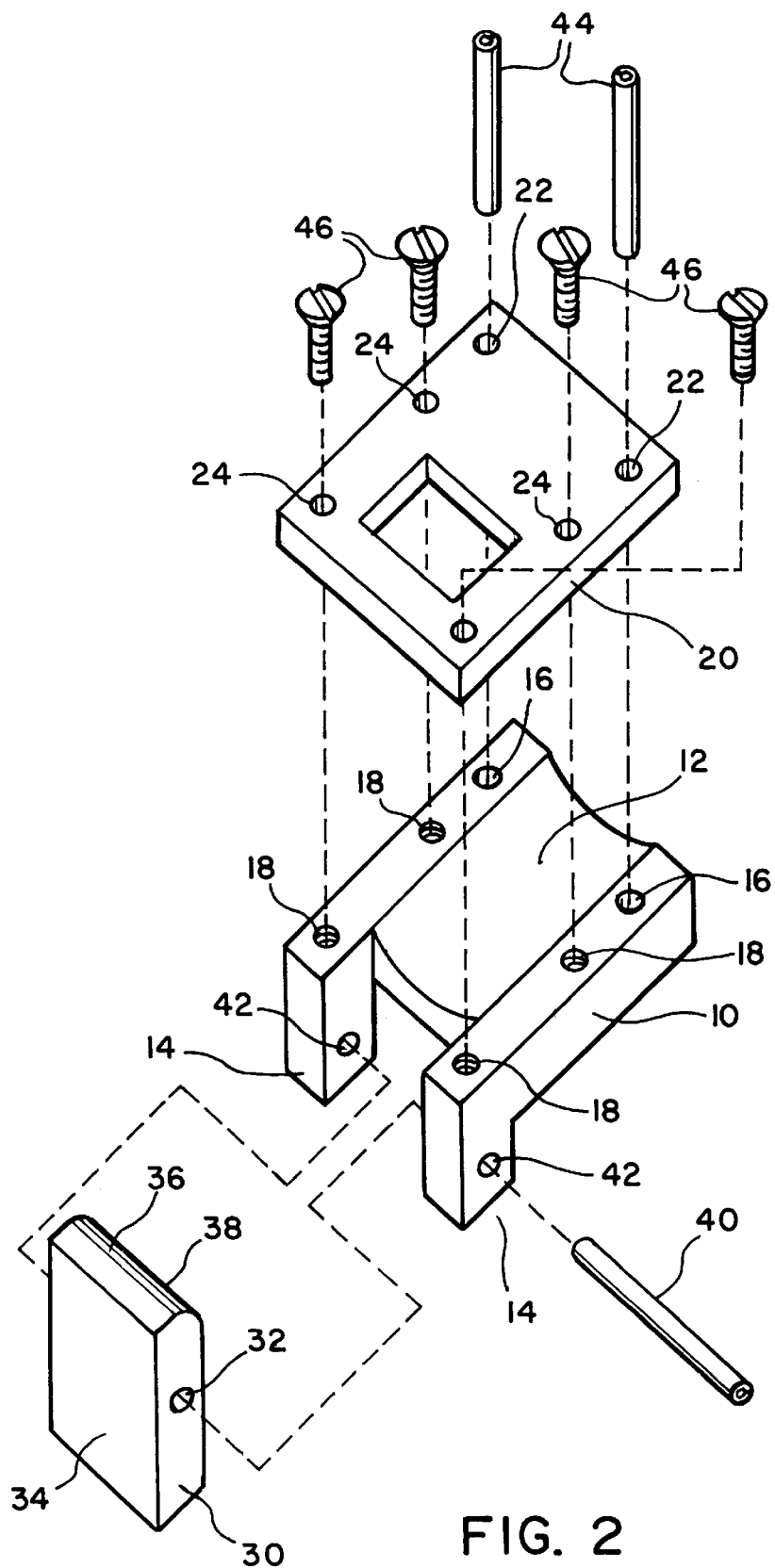
FIG. 2 is an exploded perspective assembly drawing of a preferred embodiment of the invention.

Referring more specifically to the drawings for illustrative purposes, the present invention is embodied in the apparatus generally shown in FIG. 2. It will be appreciated that the apparatus may vary as to configuration and as to detail of the parts, without departing from the basic concepts disclosed herein.

Referring to FIG. 2, the apparatus consists essentially of a tape-receiving body 10, a tape-retaining view plate 20, and a pivotable clamp/stop 30. In the embodiment shown, tape-receiving body 10 includes a longitudinal tape-receiving channel 12 having general cross-sectional contour matching that of the conventional retractable tape measure with which it is to be used. Tape-receiving body 10 is provided with "legs" or extensions 14, which have the primary function of providing a support base for pivot rod 40. Pivot rod 40 is sized to be friction-fit through holes 42 and held in place by friction once the pivot rod 40 is driven into place. As the pivot rod 40 is being driven into place, pivotable clamp/stop 30 is positioned between the legs 14 such that hole 32 in clamp/stop 30 lines up with hole 42 and is thereby held in position once pivot rod 40 is driven completely through and into place in hole 42. Hole 32, however, is slightly larger in circumference than pivot rod 40 and hole 42, and thus is free to pivot about pivot rod 40 except as otherwise motion-restricted.

Tape-retaining view plate 20 is essentially nothing more than a cover plate that conforms in general size and shape to the top portions of tape-receiving body 10. Alignment or guide pins 44 are optional, as are guide holes 16 and 22. However, assembly is easier if guide pins 44 are inserted in hole 16 of tape-receiving body 10, and plate 20 is placed on top by simply aligning the holes 22 on the extended tips of guide pins 44. Such guide pins can, if desired, also be made a permanent part of the tape-receiving body 10 by permanently fixing them in holes 16 with an extension above the top of body 10 equal to or less than the general thickness of cover plate 20.

To install the apparatus of the present invention on steel or other conventional retractable metal tape measure, the tape is placed in channel 12 with the leading edge of the tape extending beyond the legs 14, and the tape housing rearward of the tape-receiving body 10. Cover plate 20 is then placed over tape-receiving body 10 and aligned therewith and fastened in place. In the embodiment shown in FIG. 2, threaded screws 46 are passed through holes 24 into threaded holes 18 and the threaded screws tightened to fasten the cover plate 20 to the body 10. Because of the spacing arrangements, the tape resting in channel 12 is free to slide longitudinally, or the entire attachment is free to slide longitudinally of the tape unless clamp/stop 30 is placed in clamping position.

In the embodiment shown in FIG. 2, pivotable clamp/stop 30 is provided with a leading face 34 which, in clamping/stop position, will be at right angles to the tape measure and generally flush with legs 14 of body 10. The clamping end of pivotable clamp/stop 30 is generally made up of a flat surface lying in a plane that is essentially parallel to the direction of travel of the tape in the clamping position as designated 36 in the drawing, but which curves away from and down from clamping surface 36 to provide a curved or beveled surface 38. Holes 42 in body 10 and hole 32 in clamp 30 are positioned relative to each other and to the clamping surface of the tape such that when clamp 30 is pivoted into clamping position, upper surface 36 contacts the bottom of the tape contained in channel 12 and presses upward against it, creating a clamping/friction that locks the tape in place with clamp 30 at right angles to the tape. Because of this design, any pressure on the trailing edge of clamp 30 actually tightens the clamping, thereby avoiding accidental unlocking of the clamp during normal usage of the attachment of the present invention as described above. To release the clamp, however, it is only necessary to exert pressure on the leading face of the clamp below the pivot and clamp 30 pivots, releasing the tape and allowing it to once again slide.

Figure 3:
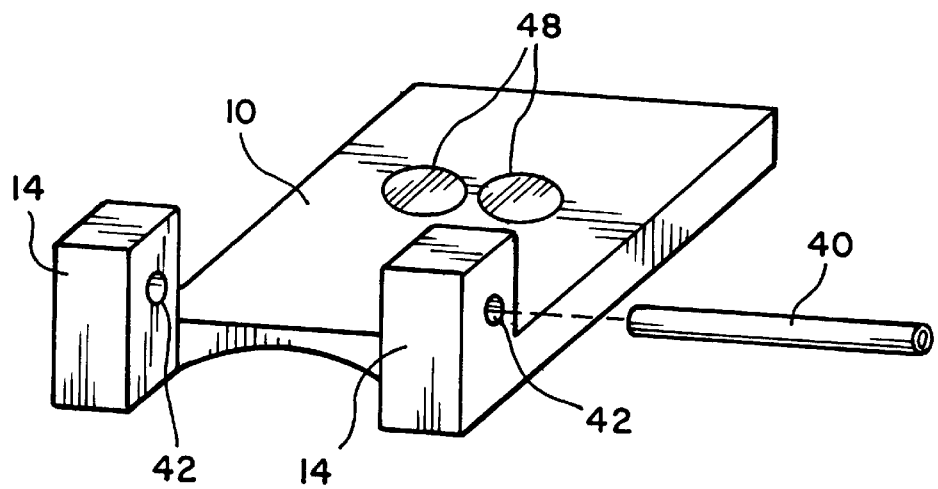
FIG. 3 is a perspective drawing of the tape-receiving body 10 of FIG. 2, showing the underside of the tape-receiving body.

FIG. 3 shows the underside of tape-receiving body 10 where like parts are numbered as in FIG. 2. The embodiment shown in FIG. 3 includes optional embedded magnets 48. The advantage of having these magnets is recognized when attempting to use the attachment of the present invention for the measurement of iron or other ferromagnetic type pipe. When the clamp 30 is locked in place and the attachment of the present invention is placed on the pipe, magnets 48 will make magnetic contact with the pipe, holding both the attachment and the retained tape in position, thereby permitting the pipefitter to extend the tape without the need for having some separate individual holding the tape and attachment in place while the measurement is being made.

Figure 4:
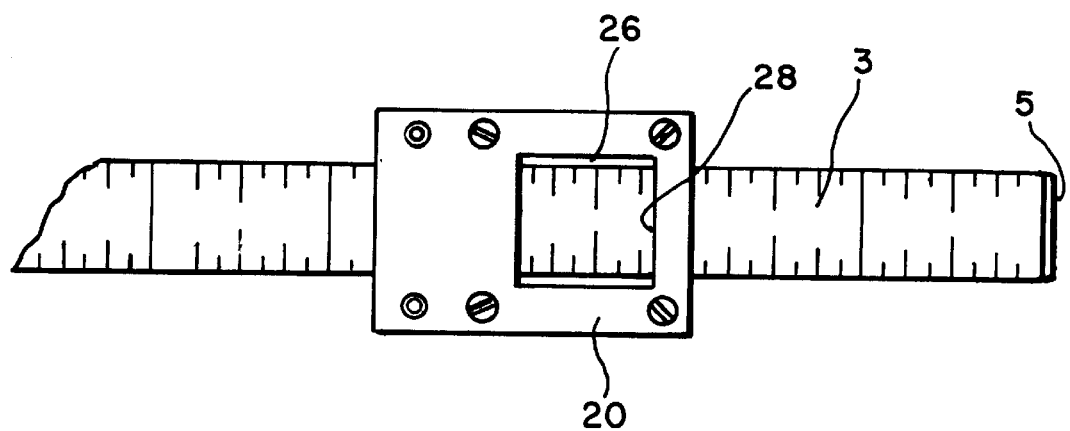
FIG. 4 is a plane view of the attachment of the present invention in clamped position on the tape with the tape being viewed through the window of the tape-retaining view plate.

FIG. 4 illustrates tape-retaining view plate 20 in which tape 3, having a leading edge 5, can be viewed through window 26. The tape is read along leading edge 28 of window 26, which may, if desired, be beveled in a manner to reduce shadows within window 26.

Figure 1:
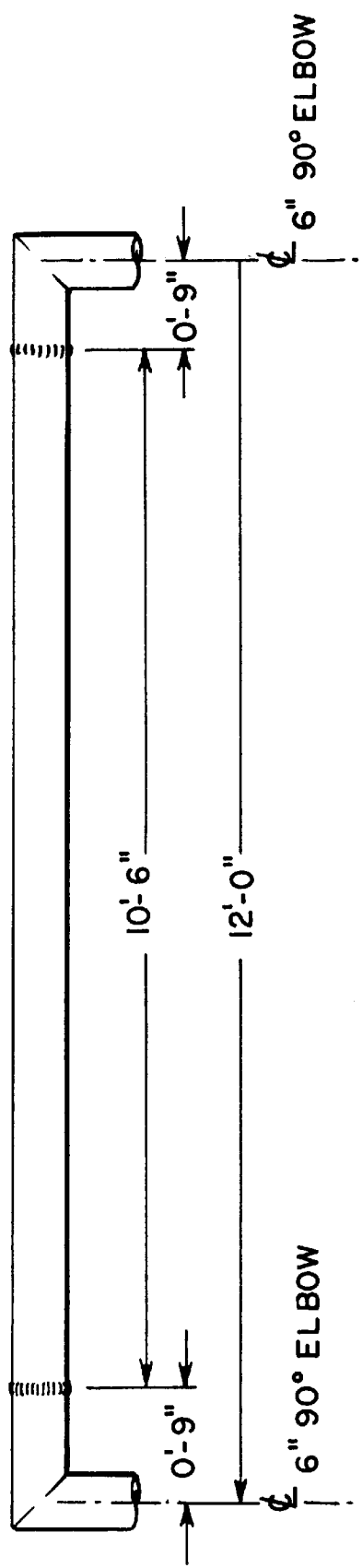
FIG. 1, as has been described previously herein, is a section of pipe with an elbow butt welded at each end for the purpose of illustrating the background of the present invention.

FIG. 5 illustrates tape 3 with housing 4 and leading edge 5 as used in the measurement of pipe for cutting from stock pipe. Pivotable clamp/stop 30 is shown in clamping position on the tape. While the reading on the tape for cutting purposes is twelve (12) feet, as shown on the engineering drawing of FIG. 1, the actual pipe length to be cut will be ten feet (10) six (6) inches, which, together with the two elbows to be butt welded will provide exactly twelve (12) foot measurement required by the architect/engineer.

FIG. 6 shows the same tape measure shown in FIG. 5, but with the pipe removed, the attachment of the present invention placed in nonclamping position, and slid to the leading edge of the tape, and the attachment and tape withdrawn into the tape measure housing and resting in recessed chamber 6.

The foregoing description of the drawings is considered to be illustrative. Numerous modifications and changes can be readily apparent to those skilled in the art, and it is not intended to limit the invention to the exact constructions and operations shown and described, and all suitable modifications and equivalents should be held to fall within the scope of the invention.

What is claimed is:

1. A take-out meter for use on a conventional retractable measuring tape comprising a tape-receiving body, a tape-retaining view plate, and a pivotable clamp/stop, said tape-receiving body having therein a longitudinal channel having a cross-sectional configuration generally corresponding to the cross-section of a conventional retractable metal measuring tape to be received therein, said tape-retaining view plate adapted to be aligned with the top of said tape-receiving body and to be affixed thereto to retain tape received into said tape-receiving body in sliding relation to said tape-receiving body and tape-retaining view plate, said pivotable clamp/stop affixed to said tape-receiving body and pivotable with respect thereto at the leading edge of said tape-receiving body, said pivotable clamp/stop pivoting from a nonclamping position parallel to the longitudinal direction of said tape-receiving body, and clamping position at right angles to said tape-receiving body with the clamping edge thereof pressing tape resting in the receiving channel of said tape-receiving body against said tape-retaining view plate when pressure is exerted on the trailing edge of said pivotable clamp/stop, said tape-retaining view plate having a window with a leading edge positioned as the measuring line for tape contained in said receiving channel and in alignment with the trailing edge of the pivotable clamp/stop in the clamping position.

2. A metal conventional retractable tape measure comprising a housing and a retractable metal tape measure in which said tape has affixed thereto a take-out meter as described in claim 1 and in which said housing has a chamber adapted to receiving said tape and said attachment when said attachment is in the nonclamping position, and said tape and attachment are retracted.

* * * * *